United States Patent
Hudson

(10) Patent No.: US 9,157,558 B2
(45) Date of Patent: Oct. 13, 2015

(54) REINFORCED FLEXIBLE HOSE

(75) Inventor: Jeremy Hudson, Halifax (GB)

(73) Assignee: AFLEX HOSE LIMITED, West Yorkshire (GB)

( * ) Notice: Subject to any disclaimer, the term of this patent is extended or adjusted under 35 U.S.C. 154(b) by 321 days.

(21) Appl. No.: 13/126,621

(22) PCT Filed: Sep. 4, 2009

(86) PCT No.: PCT/GB2009/051123
§ 371 (c)(1),
(2), (4) Date: Jun. 15, 2011

(87) PCT Pub. No.: WO2010/049712
PCT Pub. Date: May 6, 2010

(65) Prior Publication Data

US 2011/0240164 A1 Oct. 6, 2011

(30) Foreign Application Priority Data

Oct. 29, 2008 (GB) .................................. 0819817.8

(51) Int. Cl.
 *F16L 11/00* (2006.01)
 *F16L 11/112* (2006.01)
 *F16L 11/08* (2006.01)
(52) U.S. Cl.
 CPC ............. *F16L 11/112* (2013.01); *F16L 11/088* (2013.01)
(58) Field of Classification Search
 CPC ......... F16L 11/16; F16L 11/24; F16L 11/081; F16L 11/112; F16L 11/088
 USPC ......... 138/133, 134, 125, 127, 129, 122, 174, 138/132; 242/118.31
 See application file for complete search history.

(56) References Cited

U.S. PATENT DOCUMENTS

| | | | | |
|---|---|---|---|---|
| 1,361,001 A | * | 12/1920 | Blaisdell | 156/86 |
| 1,819,175 A | * | 8/1931 | James | 138/122 |
| 1,925,231 A | * | 9/1933 | Bundy | 138/122 |
| 2,448,485 A | * | 8/1948 | Chernack | 138/133 |
| 2,720,221 A | * | 10/1955 | Neilson | 138/122 |
| 3,047,026 A | * | 7/1962 | Kahn | 138/122 |

(Continued)

FOREIGN PATENT DOCUMENTS

CN 1420973 A 5/2003
EP 0629805 A2 12/1994

(Continued)

OTHER PUBLICATIONS

Internation Search Report, PCT/GB2009/051123; Nov. 27, 2009; 3 pages.

(Continued)

*Primary Examiner* — Kevin P Shaver
*Assistant Examiner* — Robert Nichols, II
(74) *Attorney, Agent, or Firm* — Howard & Howard Attorneys PLLC

(57) ABSTRACT

A flexible hose (100) having a grooved liner (102) forming a part of the side walls of the hose to define an internal bore (101). Helically formed grooves (108) are formed at an external facing side of liner (102) with an innermost side (104) comprising a substantially smooth, non-profiled surface. A coiled wire retainer (107) is housed within each groove (108) to provide a hose (100) resistant to crushing and collapse of the internal bore (101) due to kinking when the hose (100) is flexed.

13 Claims, 3 Drawing Sheets

(56) References Cited

U.S. PATENT DOCUMENTS

| | | | |
|---|---|---|---|
| 3,866,632 A * | 2/1975 | Schaffer | 138/130 |
| 4,236,509 A | 12/1980 | Takahashi et al. | |
| 4,463,779 A * | 8/1984 | Wink et al. | 138/125 |
| 4,676,229 A * | 6/1987 | Krasnicki et al. | 600/140 |
| 5,279,333 A * | 1/1994 | Lawrence | 138/121 |
| 5,462,090 A * | 10/1995 | Winter et al. | 138/121 |
| 6,464,632 B1 * | 10/2002 | Taylor | 600/139 |
| 8,066,926 B2 * | 11/2011 | Fogarty | 264/255 |
| 2007/0012815 A1 * | 1/2007 | Holden et al. | 242/610.1 |

FOREIGN PATENT DOCUMENTS

| | | |
|---|---|---|
| EP | 1975492 A2 | 1/2008 |
| GB | 426594 A | 4/1935 |
| GB | 747732 A | 4/1956 |
| GB | 2279126 A | 12/1994 |
| JP | JU59-40002 B | 11/1984 |
| JP | 62-46885 | 3/1987 |
| JP | 63-54239 | 3/1988 |
| JP | 6-44258 | 6/1994 |
| JP | JU06-44503 | 6/1994 |
| JP | 10132155 | 5/1998 |
| JP | 2003-24271 A | 1/2003 |
| JP | 2006-218157 A | 8/2006 |
| JP | 2007-168104 | 5/2007 |
| JP | 2008-229067 A | 10/2008 |
| JP | 2009172160 | 8/2009 |
| JP | 2012-506986 A | 3/2012 |
| WO | 00/39494 | 7/2000 |

OTHER PUBLICATIONS

International Search Report, Application No. GB0819817.8; Jan. 22, 2009; 1 page.

English language abstract for CN1420973, extracted from espacenet on Mar. 1, 2003.

* cited by examiner

REINFORCED FLEXIBLE HOSE

The subject patent application claims priority to and all the benefits of International Patent Application No. PCT/GB2009/051123, which was filed on Sep. 4, 2009 with the World Intellectual Property Organization, the disclosure of which is hereby incorporated by reference.

The present invention relates to a flexible hose, and in particular although not exclusively, to a flexible tubular hose having an external facing helically grooved liner with an internally smooth surface, forming an internal part of the hose wall and an elongate retainer positioned within the grooves of the liner configured to inhibit internal collapse of the hose liner upon bending.

For certain applications it is advantageous to use a hose that exhibits a good degree of flexibility whilst comprising appropriate physical and mechanical strength. Accordingly, it is conventional to include a helically wound steel wire as a reinforcing member within the hose walls.

The helical wire provides radial support to the hose construction, which acts to reinforce the hose against mechanical forces which might otherwise distort or damage the hose. In particular, the helical wire imparts resistance to crushing, and collapse of the hose due to kinking when flexed.

Steel helical wire reinforcement is conventionally implemented in a number of different embodiments. For example, the retaining wire may be embedded in a rubber liner extending along the length of the hose. Alternatively, the wire may be wrapped around the outside of an inner or intermediate liner in contact with the outer surface of the wire. It is also known to use corrugated hose liners comprising a series of helical convolutions aligned transverse to the longitudinal axis of the hose, these convolutions formed on both the internal (bore) facing side of the liner and the external facing side of the liner. The helical wire is, in turn, wound into the external facing grooves of the liner. In each known embodiment the mechanism of reinforcement is the same, namely radial support, which the wire imparts to the liners from which the hose walls are constructed. The encircling helical wire effectively forces the hose liner to maintain a circular shape, acting against the forces incurred by bending or crushing, which would otherwise distort and collapse the liner.

One problem with such hose constructions is that in spite of the helical wire reinforcement, there remains a tendency for the hose liners, or the whole hose construction, to collapse or kink when the hose is sufficiently bent, which creates a blockage in the hose bore, preventing fluid flow.

What is required is a flexible hose radially reinforced with a helical wire that provides conventional levels of flexibility and resistance to applied mechanical forces imparted during use whilst having still further improved resistance to internal collapse and kinking when flexed.

According to a first aspect of the present invention there is provided a flexible hose comprising: a liner extending along a region of a length of the hose, the liner having a first surface orientated towards an internal bore of the hose and a second surface orientated towards an external surface of the hose, the second surface comprising helical grooves extending over a region of the liner and aligned transverse to the longitudinal axis of the hose; and a helically wound elongate retainer positioned within the grooves wherein when the liner is bent, the sidewalls of the grooves press against the retainer at an inside region of the bend which creates an axial support to increase the resistance to mechanical distortion of the liner; wherein the first surface of the liner is non-profiled relative to the second surface.

The inventors have found that incorporating the elongate retainer in a lining having external facing grooves but importantly not internal facing grooves, significantly increases the resistance to crushing and internal collapse of the hose due to kinking when flexed in comparison with applying the same helical wire into the hose construction, but not located in the external facing grooves.

In particular, it is believed the elongate retainer housed within each external facing groove imparts an axial support to the liner at the inside of the bend at discreet regions along its length which acts to restrict compressive distortion and kinking at regions of the liner as the degree of flex is increased. This axial support is developed when the walls of the grooves at the inside of the bend close and press upon the retainer. Due to the relative hardness of the plastic, the groove walls do not deform, and the resultant back pressure acts to prevent axial distortion in the web region. Effectively, the length of the liner in the region around the inside of the bend is prevented from reducing/collapsing under the compressive forces applied by the bending action. Accordingly, the liner is reinforced against kinking firstly due to the conventional, radial constraining forces applied by the elongate retainer located within the grooves and secondly by the additional axial support created in the liner due to the synergistic affect of the retainer, the grooved external facing side and the non-grooved internal facing side of the liner.

The grooves may be regarded as being defined by peaks and troughs at the external facing side of the liner body. Preferably, the retainer sits against the troughs, that is, the retainer body is completely housed within each groove and does not extend to the height of each peak.

The first surface, positioned to be facing the internal bore is substantially devoid of the same type of grooves present at the second surface. That is, the first surface may comprise minor imperfections, such as surface defects or slight contour variations however relative to the second surface, the first surface may be regarded as substantially smooth.

Preferably, the liner is substantially devoid of grooves within substantially the inner quarter of the liner body in the radial direction.

It has been established that the reduction in the width of the groove in the liner which occurs when a 25 mm bore PTFE liner according to the subject invention is bent from a straight configuration to a required small bend radius is 35% of the original groove width. A retainer with a width which is 50% to 100% of the original groove width will therefore act to create a substantial axial support at the inside of the bend in the hose liner.

Preferably, the width (diameter) of the retainer is between 50% and 100% of the width of each groove in the hose liner when the hose liner is in an axially straight configuration. Preferably, the retainer and the grooves extend substantially the full length of the hose liner.

The retainer may comprise a metal wire and in particular a stainless steel wire preferably comprising helical turns.

Preferably the hose further comprises a metal or textile braid positioned against the second surface. The braid may be positioned in direct contact with the second surface and may be separated by additional liner material. Preferably, the hose further comprises a rubber or plastic outer layer positioned over the metal or textile braid.

Preferably, the grooved liner body comprises a plastic material and in particular polytetrafluoroethylene (PTFE).

A specific implementation on the present invention will now be described, by way of example only and with reference to the accompanying figures in which.

Figure 1:
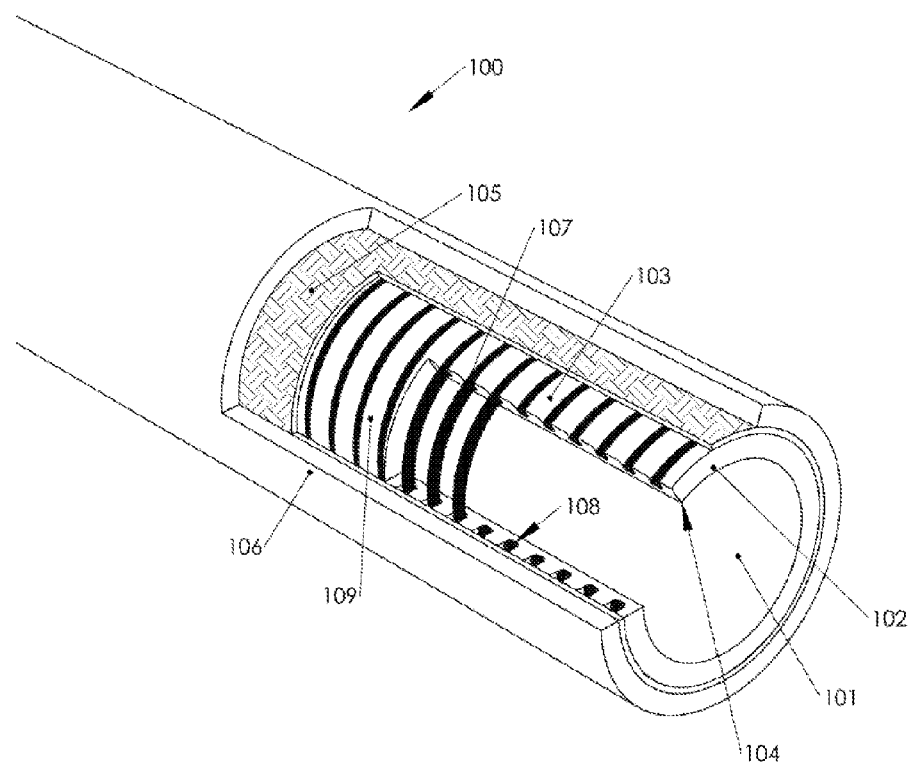
FIG. 1 is a perspective, partial cut-away view of a multi-layer hose body comprising a liner, and a coiled wire retainer positioned within helical grooves formed in the liner body according to a specific implementation of the present invention.

The flexible hose 100 comprises an inner ribbed liner 102; an intermediate metal or textile braided layer 105 and an external rubber outer cover 106.

Inner ribbed liner 102 comprises an internal facing smooth surface 104 defining the internal walls of a through bore 101 extending along the length of hose 100. An external facing side 103 of liner 102 is profiled and comprises helical ribs 109 aligned transverse to the longitudinal axis of hose 100. Grooves 108 are formed as helical turns between ribs 109 extending from the external facing surface 103 of liner 102 to a depth of approximately three quarters the thickness of liner body 102 to define the ribbed profile. An elongate retainer 107 formed by a metal wire wound into (helical) turns is housed within each groove 108 and extends substantially along the length of hose 100.

Figure 2:
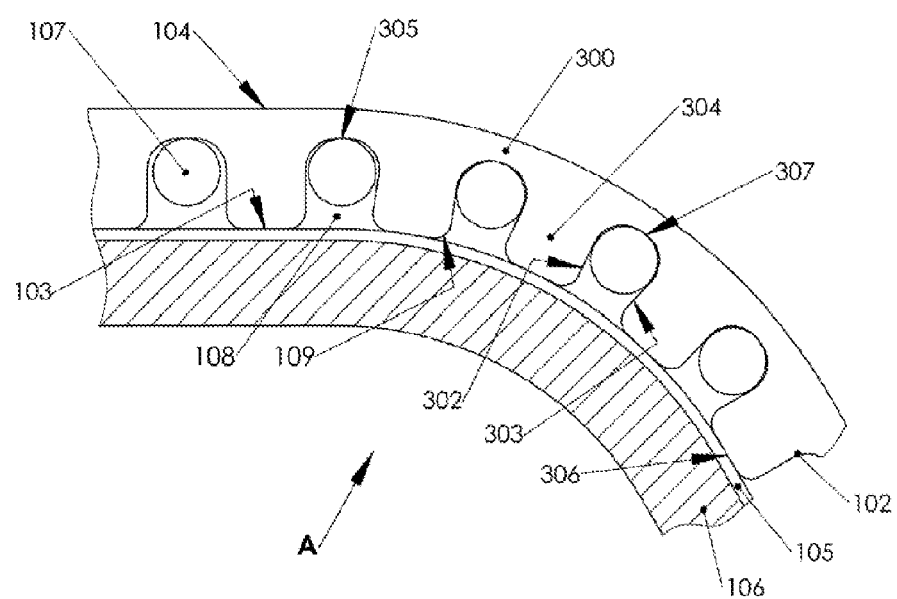
FIG. 2 illustrates schematically a cross sectional side elevation view of a bent region of the hose of FIG. 1.
Figure 3:
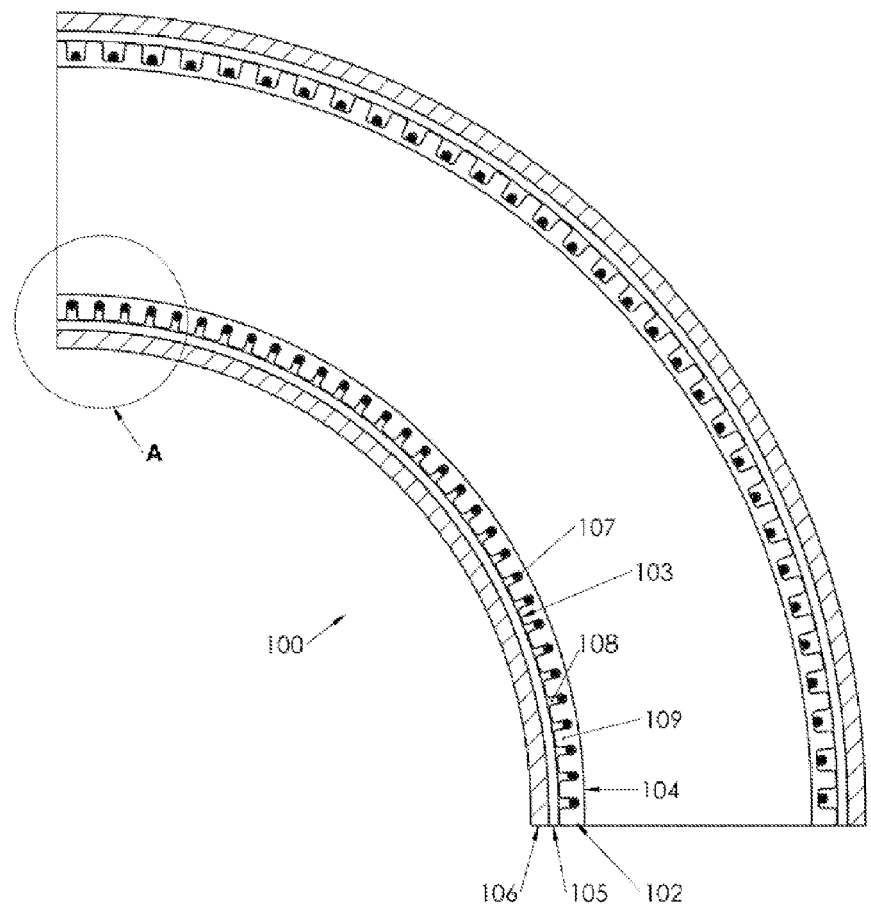
FIG. 3 illustrates a section of the bent hose wall of FIG. 2.

Referring to FIGS. 2 and 3, each groove 108 formed in liner body 102 extends from the external facing surface 103 towards internal facing surface 104 that defines internal bore 101. According to the specific implementation, a depth of each groove 108 is approximately three quarters of the thickness of liner body 102. Each groove cavity 108 is defined by side walls 302, 303 which are substantially radially configured, that is to say at 90° to the axis of the hose extending from a peak 306 at outermost facing surface 103 towards a trough 307 positioned between surfaces 103 and 104. The helical wire retainer 107 is seated against each trough 307 to be fully housed within the groove cavity 108 away from each peak 306 at external facing surface 103.

Hose liner 102 may be regarded to comprise helical 'rib' sections 304 positioned intermediate between helical grooves 108 along the length of the hose and helical 'web' sections 300 extending radially inward from each groove 108 towards internal bore surface 104.

Helical retainer 107 provides radial reinforcement of the hose and in particular liner 102 by restricting the liner to a tubular configuration (substantially circular cross sectional profile), thus imparting a resistance to crushing and collapse of hose bore 101 due to kinking when flexed as illustrated in FIGS. 2 and 3.

The flexible hose 100 is further reinforced against kinking and collapse of internal bore 101 due to the synergistic combination of a retainer 107 housed within radially oriented grooves 108 extending from an external facing side only of hose liner 102. The subject invention has been found to exhibit enhanced resistance to collapse due to the retainer providing axial support, which prevents compressive distortion of the web sections 300 of liner 102 over the portion of the liner at the inside of the bend. This axial support limits the amount of mechanical compressive distortion and kinking at liner 102 as hose 100 is flexed as illustrated in FIGS. 2 and 3. This axial support effectively inhibits collapse of liner 102 in the web regions 300 which would otherwise be observed due to the compressive forces applied by the bending action. The compressive forces due to the bending which are axially applied to the rib regions 304 of the liner at the inside of the bend are rendered ineffective by the very thick, and therefore strong wall thickness of the ribs. By configuring liner 102 and retainer 107 such that the retainer 107 sits within groove 108 and is trapped between side walls 302, 303, during bending, web section 300 is effectively prevented from compressive distortion when it is bent around the external surface 305 of retainer 107.

Importantly, the axial support of the web sections 300, that serves to prevent collapse of internal bore 101, is created by the continuous volume of the body at the region of liner 102 between the web sections 300. That is, liner 102 is devoid of grooves within substantially the inner quarter of the liner body, in the radial direction, positioned towards the central bore 101.

As will appreciated, groove cavities 108 may extend from external facing side 103 towards internal facing side 104 at any depth value so long as a predetermined liner thickness is maintained between the bottom of each trough 307 and innermost facing surface 104 to allow the as described axial support within liner 102.

The invention claimed is:

1. A flexible hose comprising:
a plastic liner extending along a region of a length of the hose, the liner having a first surface orientated towards an internal bore of the hose and a second surface orientated towards an external surface of the hose, the second surface comprising a helical groove extending over a region of the liner and aligned transverse to the longitudinal axis of the hose the groove being defined by peaks and troughs and having sidewalls that extend substantially perpendicular to the axis;
a helically wound elongate retainer positioned within the groove to sit against the troughs wherein when the liner is bent, the sidewalls of the groove press against the retainer at an inside region of the bend which creates an axial support to increase the resistance to mechanical distortion of the liner, the sidewalls being formed by the plastic liner having a hardness such that the sidewalls do not deform as they press against the retainer at an inside region of the bend such that a resultant back pressure acts to prevent axial distortion of the liner at the region radially inward of the groove;
wherein the first surface of the liner is non-profiled relative to the second surface so as to be substantially devoid of the same type of groove present at the second surface;
wherein a depth by which the groove extends into the liner from the second surface is such that the elongate retainer is completely housed within the groove; and
wherein a width of the retainer is between 50% and 100% of a minimum width of the groove between the side walls when the liner is in an axially straight configuration.

2. The hose as claimed in claim 1 wherein the retainer and the groove extend substantially the full length of the hose.

3. The hose as claimed in claim 1 wherein the retainer comprises a metal wire.

4. The hose as claimed in claim 3 wherein the retainer comprises helically wound stainless steel wire.

5. The hose as claimed in claim 1 further comprising a metal braid positioned against the second surface.

6. The hose as claimed in claim 5 further comprising a rubber outer layer positioned over the braid.

7. The hose as claimed in claim 5 further comprising a plastic outer layer positioned over the braid.

8. The hose as claimed in claim 1 further comprising a textile braid positioned against the second surface.

9. The hose as claimed in claim 8 further comprising a rubber outer layer positioned over the braid.

10. The hose as claimed in claim 8 further comprising a plastic outer layer positioned over the braid.

11. The hose as claimed in claim 1 wherein the plastic liner comprises polytetrafluoroethylene (PTFE).

12. The hose as claimed in claim 1 wherein the liner is substantially devoid of a groove within substantially the inner quarter of the liner in a radial direction.

13. The hose as claimed in claim 1 wherein a depth by which the groove extends into the liner from the second surface is substantially three quarters of a thickness of the liner between the second surface and the first surface.

* * * * *